US009179465B2

(12) United States Patent
Dimou et al.

(10) Patent No.: US 9,179,465 B2
(45) Date of Patent: Nov. 3, 2015

(54) METHODS AND DEVICES FOR ADJUSTING RESOURCE MANAGEMENT PROCEDURES BASED ON MACHINE DEVICE CAPABILITY INFORMATION

(71) Applicant: Telefonaktiebolaget L M Ericsson (publ), Stockholm (SE)

(72) Inventors: Konstantinos Dimou, Stockholm (SE); Kumar Balachandran, Pleasanton, CA (US); Havish Koorapaty, Saratoga, CA (US); Chester Park, San Jose, CA (US)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 416 days.

(21) Appl. No.: 13/633,728

(22) Filed: Oct. 2, 2012

(65) Prior Publication Data

US 2014/0094127 A1    Apr. 3, 2014

(51) Int. Cl.
*H04W 24/00* (2009.01)
*H04W 72/04* (2009.01)
*H04W 4/00* (2009.01)

(52) U.S. Cl.
CPC ............ *H04W 72/048* (2013.01); *H04W 4/005* (2013.01)

(58) Field of Classification Search
CPC .................................................... H04W 24/00
USPC ................ 455/67.11, 135, 423, 115.1, 226.1, 455/67.13, 161.3; 370/231–233, 332
See application file for complete search history.

(56) References Cited

U.S. PATENT DOCUMENTS

| | | | |
|---|---|---|---|
| 7,570,916 B2 * | 8/2009 | Xiao et al. | 455/24 |
| 8,271,013 B2 * | 9/2012 | Sagfors et al. | 455/522 |
| 2011/0086635 A1 | 4/2011 | Grob-Lipski | |
| 2013/0148576 A1 * | 6/2013 | Huang et al. | 370/328 |
| 2013/0203398 A1 * | 8/2013 | Callard et al. | 455/418 |
| 2014/0269655 A1 * | 9/2014 | Du et al. | 370/338 |

FOREIGN PATENT DOCUMENTS

| | | |
|---|---|---|
| EP | 0251562 A1 | 1/1988 |
| WO | 2010017012 A1 | 2/2010 |
| WO | 2011119680 A2 | 9/2011 |

OTHER PUBLICATIONS

International Search Report and the Written Opinion of the International Searching Authority dated Jun. 18, 2014, in International Application No. PCT/IB2013/058977, 12 pages.

* cited by examiner

*Primary Examiner* — Minh D Dao
(74) *Attorney, Agent, or Firm* — Rothwell, Figg, Ernst & Manbeck, P.C.

(57) ABSTRACT

Devices and methods for adjusting resource management procedures based on machine device capability information are disclosed. In one aspect, a method for adjusting resource management procedures in a machine device communicating with a node operating in a communication network includes receiving a first message from the machine device, the first message including machine device capability information, processing the received machine device capability information to determine an adjustment to a resource management procedure, and transmitting a second message to the machine device, the second message including the determined resource management procedure adjustment. The first and second messages may be radio resource control (RRC) messages, such as RRC connection request and setup messages.

50 Claims, 23 Drawing Sheets

| INFORMATION ELEMENTS | |
|---|---|
| Message Type | RRC Connection Request |
| UE Identity | CHOICE |
| | S-TMSI |
| | Random Value |
| Establishment Cause | CHOICE |
| | Emergency |
| | High Priority Access |
| | Mobile Terminating Access |
| | Mobile Originating Signaling |
| | Mobile Originating Data |
| UE Capability Information | CHOICE |
| | UE Mobility Pattern |
| | UE Power Supply Access |
| | UE Traffic Pattern |

| INFORMATION ELEMENTS | |
|---|---|
| Message Type | |
| RRC Transaction Identifier | |
| Dedicated Radio Resource Control | |
| Resource Management Procedure Adjustments | RRC Connection Setup |
| CHOICE | |
| | Mobility Management Procedure |
| | Radio Resource Management Procedure |

| INFORMATION ELEMENTS | |
|---|---|
| Message Type | |
| RRC Transaction Identifier | |
| UE Capability RAT Container List | |
| UE Capability Information | UE Capability Information Message |
| CHOICE | |
| | UE Mobility Pattern |
| | UE Power Supply Access |
| | UE Traffic Pattern |

| INFORMATION ELEMENTS | |
|---|---|
| Message Type | RRC Connection Reconfiguration Message |
| RRC Transaction Identifier | |
| Measurements Configuration | Optional |
| Resource Management Procedure Adjustments | CHOICE |
| | Mobility Management Procedure |
| | Radio Resource Management Procedure |

| INFORMATION ELEMENTS | |
|---|---|
| Message Type | UE Information Request |
| RRC Transaction Identifier | |
| Rach Reporting Requirement | BOOLEAN |
| Rlf Reporting Requirement | BOOLEAN |
| UE Capability Information Request | |

| INFORMATION ELEMENTS | |
|---|---|
| Message Type | UE Information Response |
| RRC Transaction Identifier | |
| Rach Report | SEQUENCE |
| | Number of Preambles Sent |
| | Contention Detected |
| Rlf Report | SEQUENCE |
| | Measurement Results of Last Served Cell |
| | Measurement Results of Neighboring Cell |
| UE Capability Information | CHOICE |
| | UE Mobility Pattern |
| | UE Power Supply Access |
| | UE Traffic Pattern |

| INFORMATION ELEMENTS | |
|---|---|
| Message Type | RRC Message (*UECapabilityEnquiry*) |
| RRC Transaction Identifier | |
| UE Capability Request | List of RATs requested |
| UE Capability Information Request | |

FIG. 20

| INFORMATION ELEMENTS | |
|---|---|
| Message Type | RRC Message (*UECapabilityInformation*) |
| RRC Transaction Identifier | |
| UE Capability RAT Container List | |
| UE Capability Information | CHOICE |
| | UE Mobility Pattern |
| | UE Power Supply Access |
| | UE Traffic Pattern |

FIG. 21

METHODS AND DEVICES FOR ADJUSTING RESOURCE MANAGEMENT PROCEDURES BASED ON MACHINE DEVICE CAPABILITY INFORMATION

TECHNICAL FIELD

The present invention relates generally to machine type communications, and more particularly, to methods and devices for adjusting resource management procedures based on machine device capability information.

BACKGROUND

Machine Type Communications (MTC) are expected to contribute heavily to connectivity and traffic within the mobile broadband industry. The GSM/EDGE system already serves a rapidly expanding market for MTC. Mobile communications operators have expressed interest in accommodating traffic that serves wireless sensors/devices within modern evolved networks such as those based on LTE. As part of this, it would be incumbent on them to handle MTC traffic served by existing cellular networks such as GSM/EDGE and to provide a transition for such traffic from e.g. GPRS/EDGE to future versions of cellular systems, such as 3GPP Long Term Evolution Advance (LTE-A, or LTE-Advanced).

Wireless sensor networks have gained increasing interest from academia and industry. Such networks have, however, predominantly been built around short range communication links, such as those based on Bluetooth, and more recently on the Zigbee standard. It is of particular interest to examine whether existing and future cellular systems can be modified to efficiently accommodate the traffic from these wireless sensor devices. This is a challenging task considering that (1) the latest versions of existing cellular systems, 3GPP systems, such as High Speed Packet Access (HSPA), LTE, or LTE-A, or IEEE systems, such as 802.16 (WiMax), are conceived primarily with the goal of providing service mainly to mobile broadband users and (2) there is a requirement from operators that these wireless devices (sensors) are low cost and have high energy efficiency.

Signaling mechanisms in existing and future 3GPP and IEEE networks have been conceived with the intention of securing a robust connection/session lasting for long periods of time, and involving transmission of large data volumes. In this respect, signaling mechanisms and protocols involving several long messages amounting to hundreds or thousands of kilobytes of data are not considered as particularly significant overhead when compared to the amount of data traffic exchanged within a session.

However, many wireless sensor devices are expected to transmit with very low activity and with long periods of inactivity between transmissions. Also, such devices typically transmit small amounts of information—typically a few hundred octets of data, indicating, e.g. a measurement, or presence. Some wireless sensor devices serve as actuating receivers, where a short message from the network of a few hundred octets of data may need to be processed and acted on. The existing signaling mechanisms for establishing and maintaining a connection are considered as considerably "heavy" for such device types or application categories, and there is a real concern that the volume of signaling traffic can quickly overwhelm the cellular network. In other words, the signaling overhead is no longer negligible for very small transmissions. In addition, keeping a connection up or reestablishing a connection on wake-up may constitute an undue burden on a device with a targeted battery life that spans years.

In the most common scenario, devices are anticipated to transmit in uplink a single packet containing measurements, warnings, or other types of information to the cellular network. Hence, data transmissions occur mainly in the uplink, while the downlink serves mainly for transmitting feedback and link control information to devices.

In this respect, entire radio network interfaces and radio resource management algorithms require new approaches. However, in order to perform these modifications to radio protocol architectures and to radio resource management, there is a need to have information on the network side regarding some characteristics of machine devices related to their capabilities, including, for example, their mobility pattern, energy supply, and traffic pattern.

Accordingly, there is a need for a method and device for adjusting radio resource management procedures based on machine device capability information that can result, for example, in a reduction in energy consumption for the machine device.

SUMMARY

Particular embodiments of the present invention are directed to devices and methods for adjusting resource management procedures based on machine device capability information.

In one particular aspect, a method for adjusting resource management procedures in a machine device communicating with a node in a communication network includes receiving a first message from the machine device. The first message includes machine device capability information. The method further includes processing the received machine device capability information to determine an adjustment to a resource management procedure and transmitting a second message to the machine device. The second message includes the determined resource management procedure adjustment.

According to particular embodiments of the present invention, the machine device capability information includes information relating to one or more of a mobility pattern, energy accessibility, and transmission pattern. The information relating to mobility pattern can indicate, for example, that the machine device is positioned at a fixed location. The information relating to energy accessibility can indicate whether the machine device has access to a power supply. The information relating to transmission pattern can indicate for the machine device, one or more of periodicity of transmissions, average data transmission size, desired sleep cycle, and modulation and coding scheme (MCS) capability. More generally, however, the machine device capability information may include or represent any appropriate information relating to the characteristics or configuration of the machine device.

In some embodiments, the determined resource management procedure adjustment includes adjusting one or more of a mobility management procedure and a radio resource management procedure. In particular embodiments, the adjusted mobility management procedure includes one or more of a time interval between measurements, time interval between reporting, report size, report quantity, number of transmissions, and one or more parameters relating to reporting triggering criteria. In some embodiments, the adjusted radio resource management procedure includes one or more of scheduling, link adaptation, power control, load control, and DRX cycle.

In particular embodiments, the first message and the second message are radio resource control (RRC) messages. In some embodiments, the first message is a RRC connection request message and the second message is a RRC connection setup message.

Some embodiments further provide for transmitting, prior to receiving the first message, a third message to the machine device, the third message including a request for machine device capability information. In some embodiments, the third message is a RRC message.

Particular embodiments of the present invention provide a node operable in a communication network to transmit messages to and receive messages from a machine device. According to certain embodiments, the node includes a processor, a memory coupled to the processor, a network interface coupled to the processor, a transceiver coupled to the network interface, and an antenna coupled to the transceiver which is configured to transmit and receive messages. In some embodiments, the processor is configured to receive a first message from the machine device. The first message includes machine device capability information. The processor is further configured to process the received machine device capability information to determine an adjustment to a resource management procedure and transmit a second message. The second message includes the determined resource management procedure adjustment.

According to particular embodiments of the present invention, the machine device capability information includes information relating to one or more of mobility pattern, energy accessibility, and transmission pattern. The information relating to mobility pattern can indicate, for example, that the machine device is positioned at a fixed location. The information relating to energy accessibility can indicate whether the machine device has access to a power supply. The information relating to transmission pattern can indicate for the machine device, one or more of periodicity of transmissions, average data transmission size, desired sleep cycle, and modulation and coding scheme (MCS) capability.

In some embodiments, the determined resource management procedure adjustment includes adjusting one or more of a mobility management procedure and a radio resource management procedure. In particular embodiments, the adjusted mobility management procedure includes one or more of a time interval between measurements, time interval between reporting, report size, report quantity, number of transmissions, and one or more parameters relating to reporting triggering criteria. In some embodiments, the adjusted radio resource management procedure includes one or more of scheduling, link adaptation, power control, load control, and DRX cycle.

In particular embodiments, the first message and the second message are radio resource control (RRC) messages. In some embodiments, the first message is a RRC connection request message and the second message is a RRC connection setup message.

In some embodiments, the processor is further configured to transmit, prior to receiving the first message, a third message to the machine device, the third message including a request for machine device capability information. In some embodiments, the third message is a RRC message.

In another particular aspect, a method for adjusting resource management procedures in a machine device communicating with a node in a communication network includes identifying machine device capability information for transmission to the node and transmitting a first message to the node. The first message includes the machine device capability information. The method further includes receiving a second message from the node including a determined adjustment to a resource management procedure and adjusting the resource management procedure based on the received determined adjustment.

According to particular embodiments of the present invention, the machine device capability information includes information relating to one or more of mobility pattern, energy accessibility, and transmission pattern. The information relating to mobility pattern can indicate, for example, that the machine device is positioned at a fixed location. The information relating to energy accessibility can indicate whether the machine device has access to a power supply. The information relating to transmission pattern can indicate for the machine device, one or more of periodicity of transmissions, average data transmission size, desired sleep cycle, and modulation and coding scheme (MCS) capability.

In some embodiments, the determined resource management procedure adjustment includes adjusting one or more of a mobility management procedure and a radio resource management procedure. In particular embodiments, the adjusted mobility management procedure includes one or more of a time interval between measurements, time interval between reporting, report size, report quantity, number of transmissions, and one or more parameters relating to reporting triggering criteria. In some embodiments, the adjusted radio resource management procedure includes one or more of scheduling, link adaptation, power control, load control, and DRX cycle.

In particular embodiments, the first message and the second message are radio resource control (RRC) messages. In some embodiments, the first message is a RRC connection request message and the second message is a RRC connection setup message.

Some embodiments further provide for receiving, prior to transmitting the first message, a third message from the node, the third message including a request for machine device capability information. In some embodiments, the third message is a RRC message.

In some embodiments, the method further comprises measuring, prior to transmitting the first message to the node, a value relating to a radio channel quality for transmitting to the node, and transmitting the first message to the node only when the measured value is greater than a predetermined threshold value.

Particular embodiments provide a machine device operable in a communication network to transmit messages to and receive messages from a node. According to certain embodiments of the present invention, the machine device includes a processor, a memory coupled to the processor, a transceiver coupled to the processor, and an antenna coupled to the transceiver which is configured to transmit and receive messages. In some embodiments, the processor is configured to identify machine device capability information for transmission to the node and transmit a first message to the node. The first message includes the machine device capability information. The processor is further configured to receive a second message from the node including a determined adjustment to a resource management procedure and adjust the resource management procedure based on the received determined adjustment.

According to particular embodiments of the present invention, the machine device capability information includes information relating to one or more of mobility pattern, energy accessibility, and transmission pattern. The information relating to mobility pattern can indicate, for example, that the machine device is positioned at a fixed location. The information relating to energy accessibility can indicate whether the machine device has access to a power supply. The information relating to transmission pattern can indicate for the machine device, one or more of periodicity of transmissions, average data transmission size, desired sleep cycle, and modulation and coding scheme (MCS) capability.

In some embodiments, the determined resource management procedure adjustment includes adjusting one or more of a mobility management procedure and a radio resource management procedure. In particular embodiments, the adjusted mobility management procedure includes one or more of a time interval between measurements, time interval between reporting, report size, report quantity, number of transmissions, and one or more parameters relating to reporting triggering criteria. In some embodiments, the adjusted radio resource management procedure includes one or more of scheduling, link adaptation, power control, load control, and DRX cycle.

In particular embodiments, the first message and the second message are radio resource control (RRC) messages. In some embodiments, the first message is a RRC connection request message and the second message is a RRC connection setup message.

In some embodiments, the processor is further configured to receive, prior to transmitting the first message, a third message from the node, the third message including a request for machine device capability information. In some embodiments, the third message is a RRC message.

In some embodiments, the processor is further configured to measure, prior to transmitting the first message to the node, a value relating to a radio channel quality for transmitting to the node, and to transmit the first message to the node only when the measured value is greater than a predetermined threshold value.

The above and other aspects and embodiments are described below with reference to the accompanying drawings.

BRIEF DESCRIPTION OF THE DRAWINGS

The accompanying drawings, which are incorporated herein and form part of the specification, illustrate various embodiments of the present disclosure and, together with the description, further serve to explain the principles of the disclosure and to enable a person skilled in the pertinent art to make and use the embodiments disclosed herein. In the drawings, like reference numbers indicate identical or functionally similar elements.

FIG. 10 is a diagram of information elements of a UE capability information message for use in a method for adjusting radio resource management procedures in a machine device communicating with a node in a communication network, in accordance with exemplary embodiments of the present invention.

FIG. 16 is a diagram of information elements of a UE information response for use in a method for adjusting radio resource management procedures in a machine device communicating with a node in a communication network, in accordance with exemplary embodiments of the present invention.

FIG. 20 is a diagram of information elements of a radio resource control (RRC) message in the form of a UECapabilityEnquiry message for use in a method for adjusting radio resource management procedures in a machine device communicating with a node in a communication network, in accordance with exemplary embodiments of the present invention.

FIG. 21 is a diagram of information elements of a radio resource control (RRC) message in the form of a UECapabilityInformation message for use in a method for adjusting radio resource management procedures in a machine device communicating with a node in a communication network, in accordance with exemplary embodiments of the present invention.

DETAILED DESCRIPTION

In exemplary embodiments of the disclosed methods and devices, a method for adjusting resource management procedures based on machine device capability information is described. In the methods and devices described herein, resource management procedures in a machine device in communication with a node are adjusted to, for example, optimize energy consumption for the machine device and minimize unnecessary communication traffic. Adjustments are made in response to machine device capability information including one or more of a mobility pattern, energy accessibility and transmission pattern. For example, in response to machine device capability information that indicates that the machine device is located at a fixed position, the node may make use of this information to perform light mobility management, which dispenses with handover and cell reselection.

Figure 1:
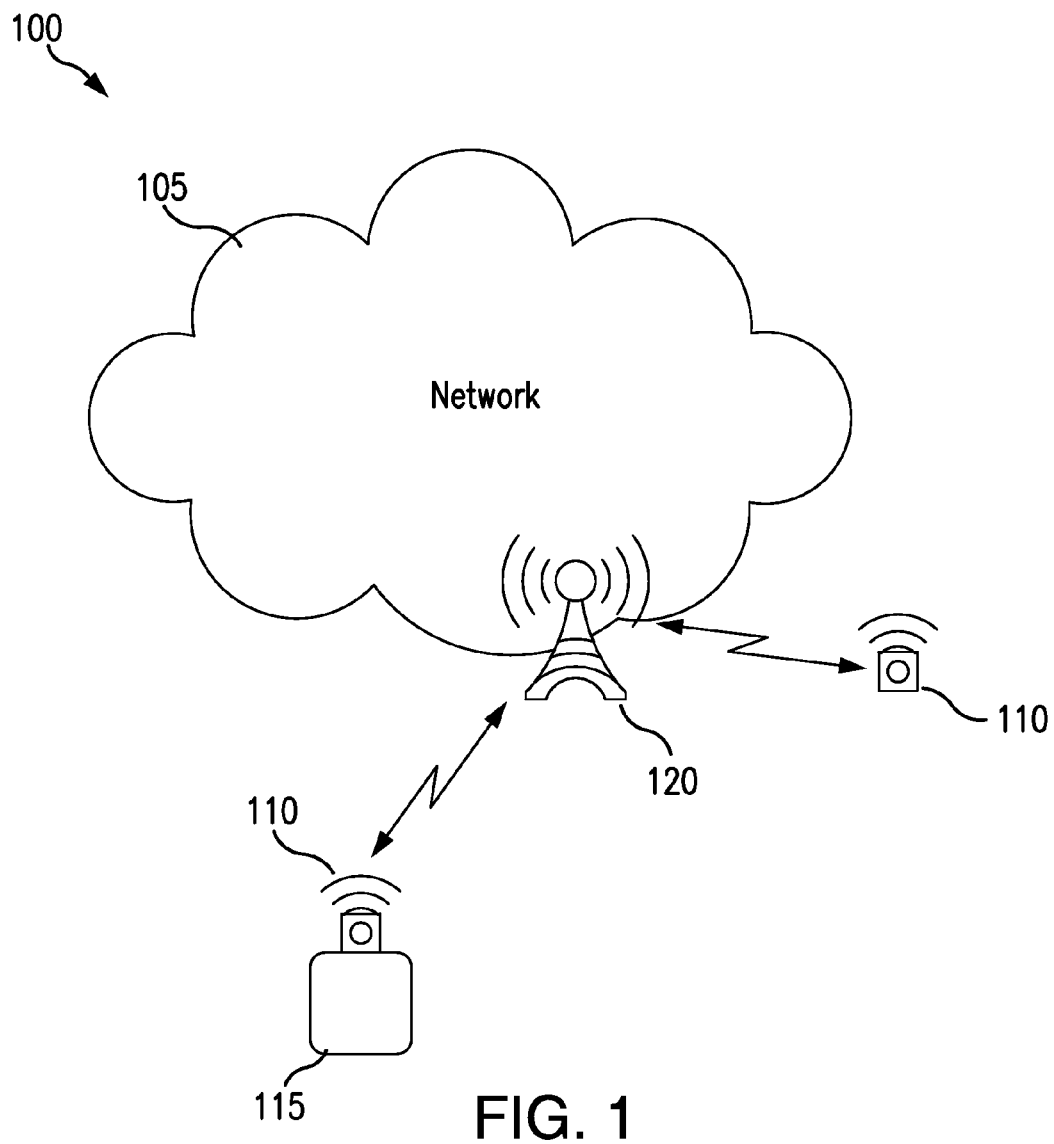
FIG. 1 illustrates an architecture of a wireless communication system with a machine type communication deployment, in accordance with exemplary embodiments of the present invention.

Referring now to FIG. 1, an architecture of a wireless communication system 100 with a machine type communication (MTC) deployment, in accordance with exemplary embodiments of the present invention, is illustrated. As shown, wireless communication system 100 includes a wireless network 105, machine devices 110, a fixed location 115, and a node 120. Examples of machine devices 110 include wireless User Equipment (UE) and communication devices, such as, for example, detection instruments for use in agriculture, forestry, and other applications with large areas of deployment and relatively low access to power, mobile telephones, personal digital assistants, electronic readers, portable electronic tablets, personal computers, and laptop computers. Examples of node 120 include base stations and relay nodes, such as, for example, serving eNodeB (eNB), high power, and macrocell base stations and relay nodes.

Figure 2:
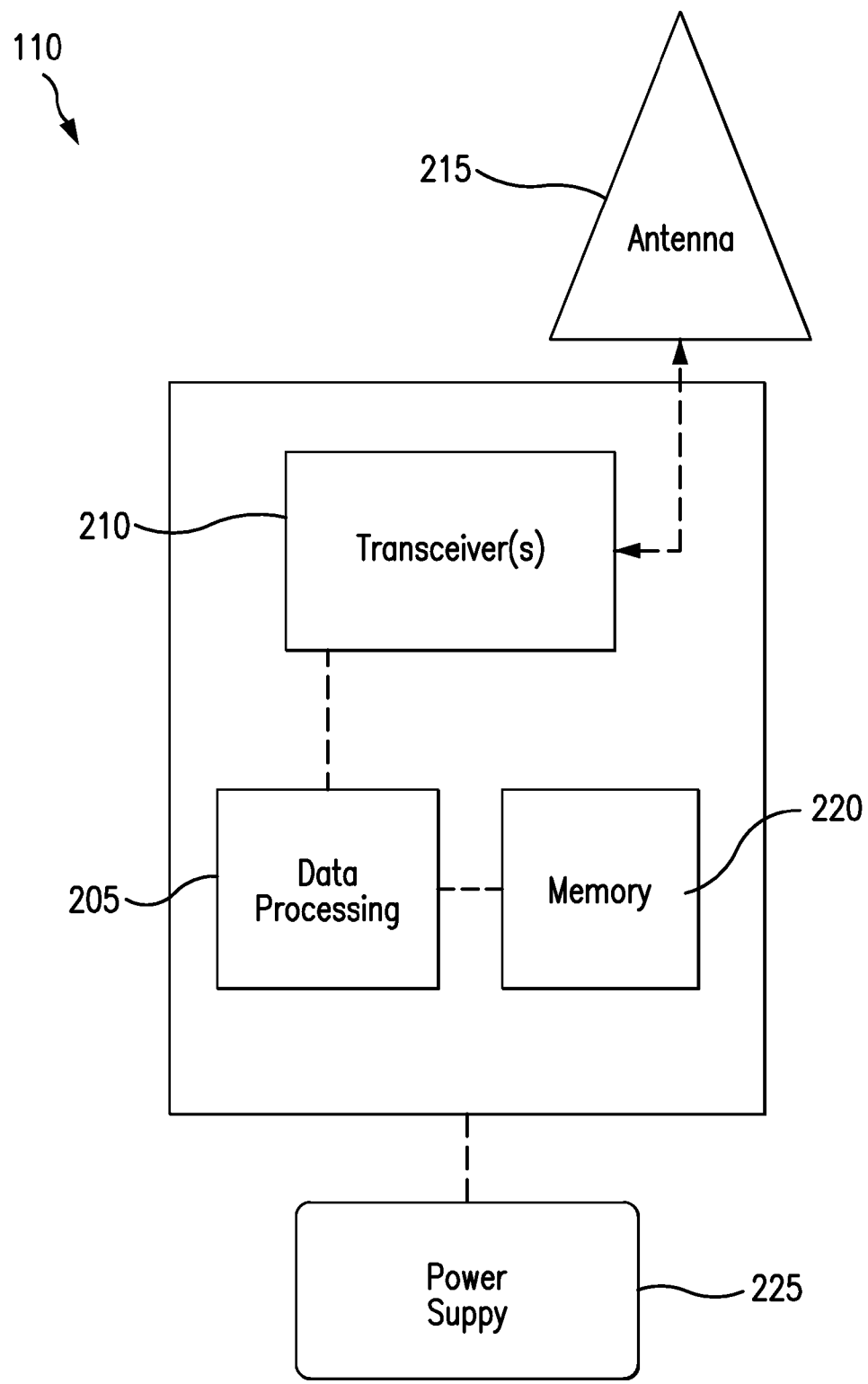
FIG. 2 is a block diagram of a machine device, as used in the system of FIG. 1, in accordance with exemplary embodiments of the present invention.

Referring now to FIG. 2, a block diagram of a machine device 110, as used in the system of FIG. 1 in accordance with exemplary embodiments of the present invention, is illustrated. As shown in FIG. 2, machine device 110 may include: a data processing system 205, which may include one or more microprocessors and/or one or more circuits, such as an application specific integrated circuit (ASIC), field-programmable gate arrays (FPGAs), and the like; a transceiver 210 for transmitting data to (and receiving data from) node 120 via one or more antennas 215; and a memory 220, which may include one or more non-volatile storage devices and/or one or more volatile storage devices (e.g., random access memory (RAM)). In embodiments where data processing system 205 includes a microprocessor, computer readable program code may be stored in a computer readable medium, such as, but not limited, to magnetic media (e.g., a hard disk), optical media (e.g., a DVD), memory devices (e.g., random access memory), and the like. In some embodiments, computer readable program code is configured such that when executed by a processor, the code causes mobile device 110 to perform steps described below (e.g., steps described below with reference to the flow charts shown in FIGS. 7, 12, 18, 23). In other embodiments, mobile device 120 is configured to perform the steps described above without the need for code. That is, for example, data processing system 205 may consist merely of one or more ASICs. Hence, the features of the present invention described above may be implemented in hardware and/or software. For example, in particular embodiments, the functional components of mobile device 110 described above may be implemented by data processing system 205 executing computer instructions, by data processing system 205 operating independent of any computer instructions, or by any suitable combination of hardware and/or software.

Figure 3:
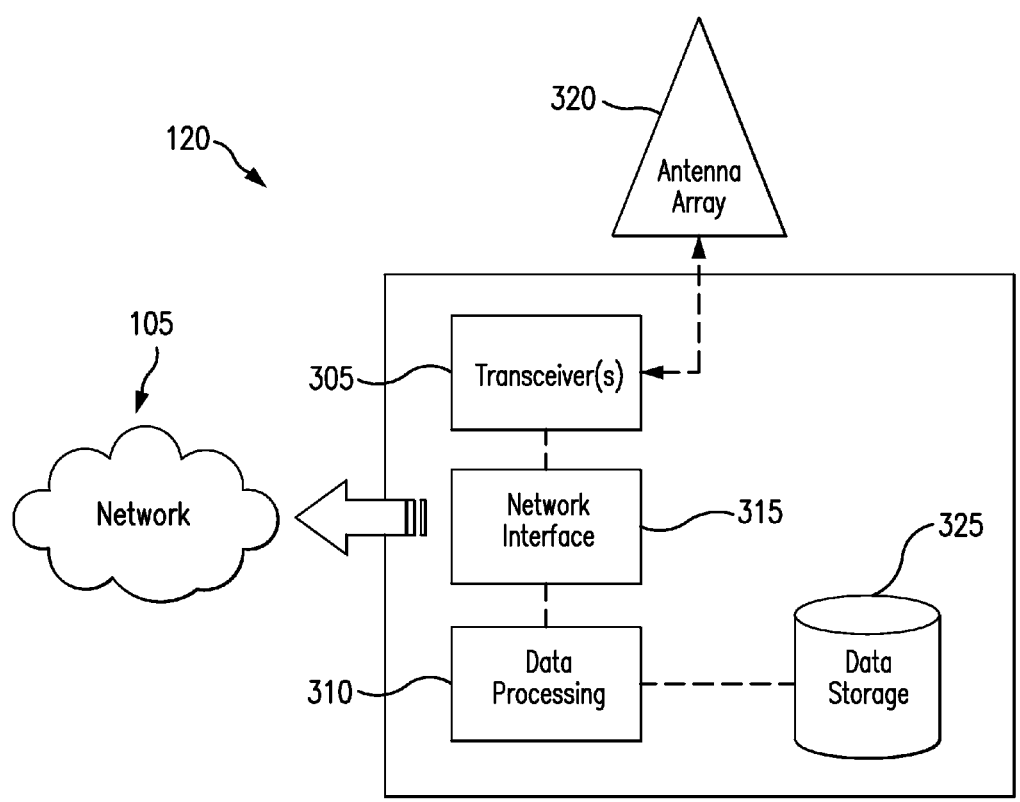
FIG. 3 is a block diagram of a node, as used in the system of FIG. 1, in accordance with exemplary embodiments of the present invention.

Referring now to FIG. 3, a block diagram of node 120, as used in the system of FIG. 1 in accordance with exemplary embodiments of the present invention, is illustrated. As shown in FIG. 3, node 120 may include: a data processing system 310, which may include one or more microprocessors and/or one or more circuits, such as an application specific integrated circuit (ASIC), Field-programmable gate arrays (FPGAs), and the like; network interface 315; and a data storage system 325, which may include one or more non-volatile storage devices and/or one or more volatile storage devices (e.g., random access memory (RAM)). The network interface 315 is connected to transceiver 305, which is configured to transmit and receive signals via one or more antennas, such as, for example, an antenna array 320. In embodiments where data processing system 310 includes a microprocessor, computer readable program code may be stored in a computer readable medium, such as, but not limited, to magnetic media (e.g., a hard disk), optical media (e.g., a DVD), memory devices (e.g., random access memory), and the like. In some embodiments, computer readable program code is configured such that, when executed by a processor, the code causes the data processing system 310 to perform steps described below (e.g., steps described below with reference to the flow charts shown in FIGS. 8, 13, 17, 22). In other embodiments, the node 120 is configured to perform the steps described above without the need for code. That is, for example, data processing system 310 may consist merely of one or more ASICs. Hence, the features of the present invention described above may be implemented in hardware and/or software. For example, in particular embodiments, the functional components of the node 120 described above may be implemented by data processing system 310 executing computer instructions, by data processing system 310 operating independent of any computer instructions, or by any suitable combination of hardware and/or software.

Figure 4:
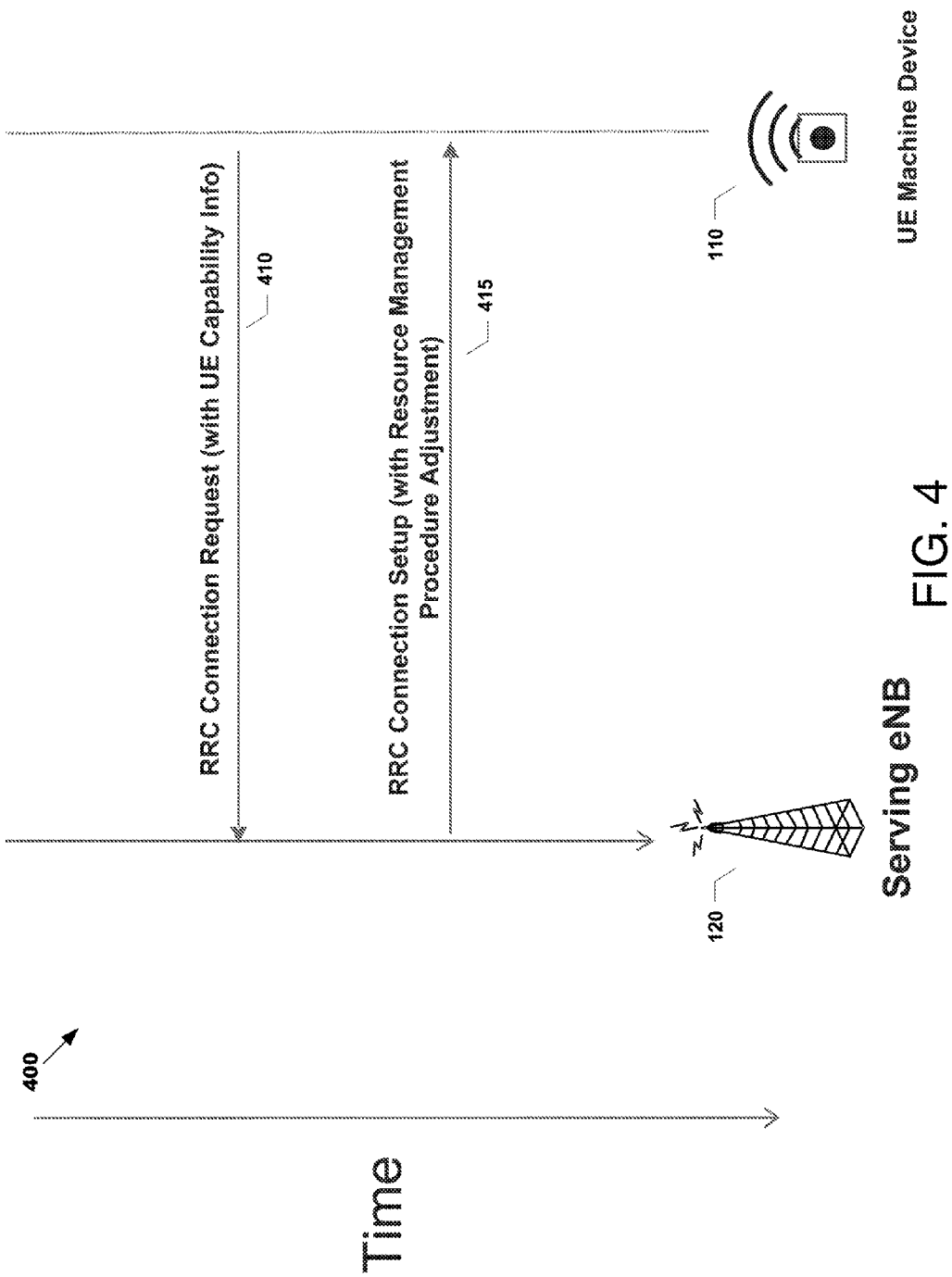
FIG. 4 is a time sequence diagram illustrating a first exemplary messaging flow for a method for adjusting radio resource management procedures in a machine device communicating with a node in a communication network, in accordance with exemplary embodiments of the present invention.

Referring now to FIG. 4, a time sequence diagram 400 illustrating a first exemplary messaging flow for a method for adjusting resource management procedures based on machine device capability information, in accordance with exemplary embodiments of the present invention, is shown. In one embodiment, UE machine device 110 sends a radio resource control (RRC) connection request 410 to serving eNB 120. The RRC connection request, in this exemplary embodiment, includes UE machine device capability information which may include one or more of a mobility pattern, energy accessibility status, and transmission pattern. In response to the RRC connection request 410, the serving eNB 120 may send a RRC connection setup message 415 to the UE machine device 110. The RRC connection setup message, in this exemplary embodiment, may include a resource management procedure adjustment which in turn may include one or more of a mobility management procedure adjustment and a radio resource management procedure adjustment.

The mobility pattern may indicate whether the UE machine device 110 is placed on a fixed location. The energy accessibility status may indicate whether the UE machine device 110 is located at a place where power supply is available and connected to power. The transmission pattern may indicate if the UE machine device 110 is going to transmit according to a specific pattern. This could include, for example, information pertaining to the periodicity of transmissions, average data transmission size, sleep cycle, modulation and coding scheme (MCS) capability, and any other appropriate information relating to a transmission pattern.

The UE machine device capability information may be available to the manufacturer, owner, user, or those installing the device. Thus, such information can be hard-coded into the device, set/configured manually by those installing and deploying the device, or automatically detected by the device. In one embodiment, the UE machine device information may include a mobility pattern that indicates the device is fixed, and that information may be hard-coded into the device. In such a configuration, the device may not be moved once installed, as movement would result in erroneous mobility management (MM) and radio resource management (RRM).

In another embodiment, the UE machine device capability information may be automatically detected by the UE machine device 110. The data processing system 205 of UE machine device 110, in this exemplary embodiment, may determine to transmit the UE machine device capability information under appropriate conditions, such as when there is a change in the capability information. For example, in one embodiment, a mobility pattern may be obtained from a GPS contained on the UE machine device and transmitted when the device is moved or in response to a machine device capability information request. In another embodiment, the energy accessibility may be determined by the data processing system 205 by monitoring the output of a power management unit and transmitted after the device is connected or disconnected from a power source or in response to a machine device capability information request as described in later embodiments. In yet another embodiment, the transmission pattern can be calculated by the data processing system 205 based on past transmission records stored in memory 220 and transmitted when the pattern changes or, as described in later embodiments, in response to a machine device capability information request.

In some embodiments, the UE machine device 110 may measure, prior to transmitting machine device capability information to the serving eNB 120, a value relating to a radio channel quality for transmitting to the node, and transmit the machine device capability information only when the measured value is above a predefined threshold. For example, the UE machine device 110 may measure the Reference Signal Received Power (RSRP), Reference Signal Received Quality (RSRQ), and Signal to Interference plus Noise Ratio (SINR) and transmit the machine device capability information only when the RSRP/RSRQ/SINR is above a certain threshold. Typical threshold values may be, for example, −85 dBm for RSRP, 15 dB for RSRQ, and 15 dB for SINR, assuming a noise-plus-interference level of −100 dBm.

Figure 5:
FIG. 5 is a diagram of information elements of a radio resource control (RRC) connection request for use in a method for adjusting radio resource management procedures in a machine device communicating with a node in a communication network, in accordance with exemplary embodiments of the present invention.

FIG. 5 is a diagram of information elements 500 of a radio resource control (RRC) connection request message for use in a method for adjusting radio resource management procedures based on machine device capability information, in accordance with exemplary embodiments of the present invention. The diagram 500 illustrates the information elements that may be included in the RRCconnection request message 410 sent from the UE machine device 110 to the serving eNB 120, as shown in the time sequence diagram 400 illustrated in FIG. 4.

Figure 6:
FIG. 6 is a diagram of information elements of a radio resource control (RRC) connection setup for use in a method for adjusting radio resource management procedures in a machine device communicating with a node in a communication network, in accordance with exemplary embodiments of the present invention.

FIG. 6 is a diagram of information elements 600 of a radio resource control (RRC) connection setup message for use in a method for adjusting radio resource management procedures based on machine device capability information, in accordance with exemplary embodiments of the present invention. The diagram 600 illustrates the information elements that may be included in the RRCconnectionsetup message 415 sent from the UE machine device 110 to the serving eNB 120, as shown in the time sequence diagram 400 illustrated in FIG. 4.

In an exemplary embodiment, the RRC connection request message 410 may be in accordance with 3GPP TS 36.331, with information elements added to indicate the UE machine device capability information, which, as discussed above, may include one or more of a mobility pattern, energy accessibility status, and transmission pattern. For example, a new information element with a Boolean value, one bit information, indicating if the UE machine device 110 is stationary, may be added as a basic UE mobility pattern. Similar information elements may be added for power supply access and traffic pattern. These information elements are provided by way of example only, and any number or form of information elements may be added to indicate the UE machine device capability information.

Figure 7:
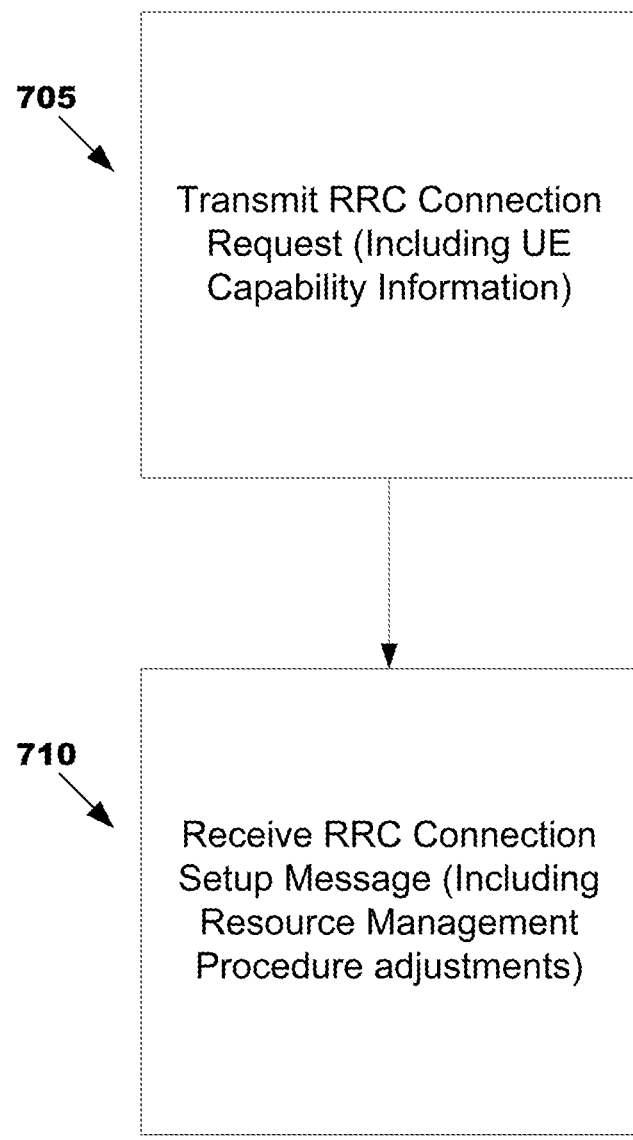
FIG. 7 is a flow chart illustrating the steps performed by a machine device in a method for adjusting radio resource management procedures in a machine device communicating with a node in a communication network using a radio resource control (RRC) connection request and RRC connection setup message, in accordance with exemplary embodiments of the present invention.
Figure 8:
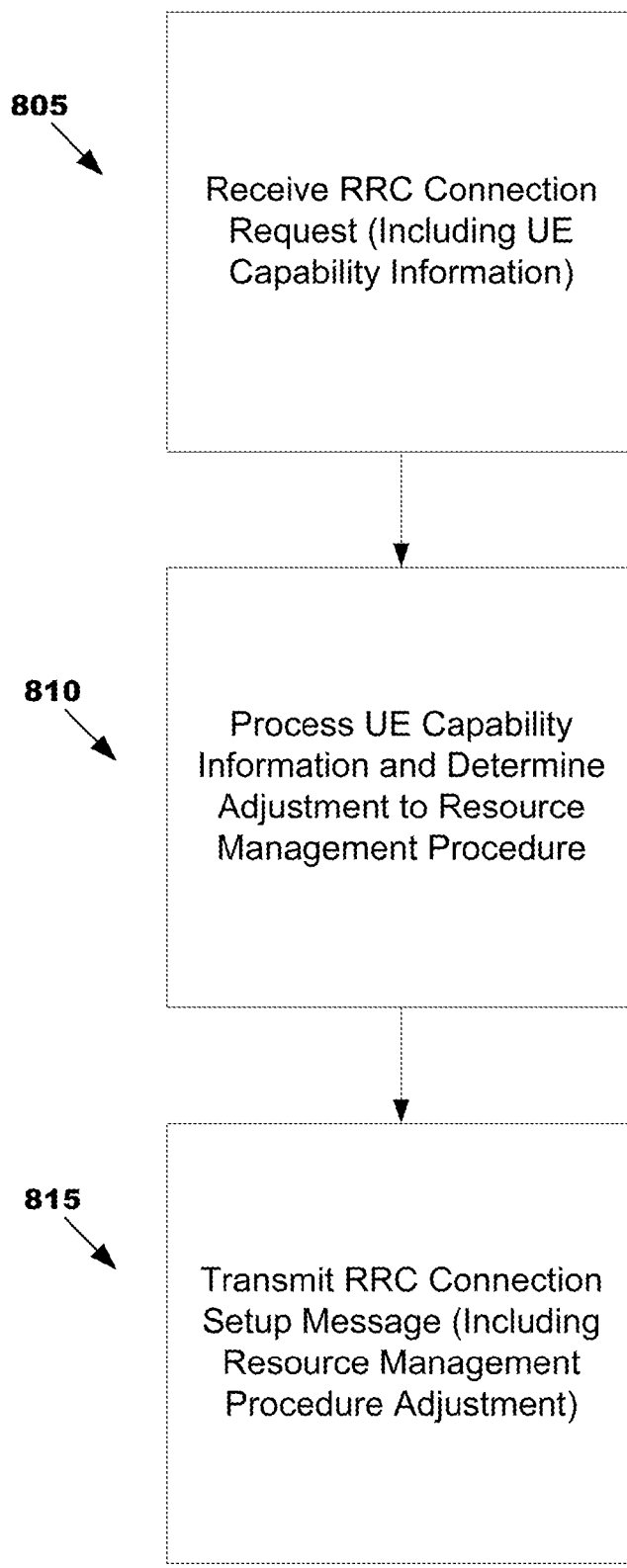
FIG. 8 is a flow chart illustrating the steps performed by a node in a method for adjusting radio resource management procedures in a machine device communicating with a node in a communication network using a radio resource control (RRC) connection request and RRC connection setup message, in accordance with exemplary embodiments of the present invention.

Referring now to FIGS. 7 and 8, flow charts illustrating a method for adjusting radio resource management procedures based on machine device capability information using a RRC connection request and setup message, in accordance with exemplary embodiments of the present invention, are provided. In the flow chart of FIG. 7, the steps are being performed by the UE machine device 110. In the flow chart of FIG. 8, the steps are being performed by the serving eNB 120.

Referring first to FIG. 7, in step 705, the UE machine device 110 transmits a RRC connection request to the serving eNB 120 which includes UE machine device capability information. Then, in step 710, the UE machine device 110 receives from the serving eNB 120 a RRC connection setup message which may include resource management procedure adjustments determined by the serving eNB 120. As described above, the resource management procedure adjustments may include one or more of a mobility management procedure and a radio resource management procedure.

Referring now to FIG. 8, in step 805, the serving eNB 120 receives the RRC connection request from the UE machine device 110, which includes the UE machine device capability information. Then, in step 810, the serving eNB 120 processes the received machine device capability information and determines an adjustment to a resource management procedure to be used by the UE machine device 110. Finally, in step 815, the serving eNB transmits the resource management procedure adjustment to the UE machine device 110 as part of a RRC connection setup message.

In response to the machine device capability information, the serving eNB 120 may decide to make resource management procedure adjustments which include one or more of a mobility management procedure and a radio resource management procedure. Mobility management procedure adjustments may include adjustments to the time interval between measurements, time interval between reporting, report size, report quantity, number of transmissions, parameters relating to reporting triggering criteria, and any other relevant procedure related to mobility management. Report quantity adjustments, for example, may include adjustments to RSRP and RSRQ. Parameter adjustments related to the event triggering the measurement report may be, for example, cell-specific offsets. Radio resource management procedure adjustments may include adjustments to one or more of scheduling, link adaptation, power control, load control, DRX cycle, and any other relevant procedure related to radio resource management.

As described above, the information relating to the mobility pattern may indicate whether the UE machine device 110 is at a fixed location. In one exemplary embodiment, if the UE machine device 110 is indeed located at a fixed position (as reported by the mobility pattern), the serving eNB 120 may decide to apply "light" mobility management (MM) for the UE machine device. "Light" MM implies that the UE machine device 110 does not need to perform frequent MM related measurements that a device would otherwise need to perform if it were mobile. In this case, the UE machine device 110 would not need to make measurements on reference symbols for purposes of handover or cell reselection. Moreover, the UE machine device would not need to transmit sounding reference signals (SRS) in UL to the serving eNB 120. Additionally, the serving eNB 120 would not need to page the UE machine device 110 for subsequent data transmissions. After determining to apply light MM, the eNB 120 transmits the mobility management procedure adjustment to the UE machine device 110 as part of a resource management procedure adjustment.

In another exemplary embodiment, if the UE machine device 110 is located in a fixed position, the serving eNB 120 may decide to apply "customized" radio resource management (RRM). "Customized" RRM refers to scheduling, link adaptation, power control, and load control mechanisms which take into consideration the fact that the UE machine device 110 is not moving, resulting in relatively unchanging radio attenuation due to distance between the serving eNB 120 and the UE machine device 110. For example, Radio Link Failure (RLF) triggering may be removed in certain customized RRM embodiments. In another embodiment, where the UE machine device is stationary, the customized RRM may include reducing the frequency of transmission power control (TPC) to the UE machine device 110. The serving eNB 120 would accomplish this by transmitting a radio resource management procedure to the UE machine device 110 as part of a resource management procedure adjustment.

In yet another exemplary embodiment, if the UE machine device 110 is stationary, the customized RRM may include setting an initial transmission power level of random access attempts to a value which is determined at the end of a previous random access attempt. In another embodiment, setting the initial transmission power level may occur during an initial uplink transmission following a long period of inactivity, such as, for example, a long DRX cycle sleeping mode.

In yet another exemplary embodiment, the machine device capability information includes information relating to energy accessibility that indicates access to a limited amount of energy by the UE machine device 110. In such a scenario, energy efficient MM and RRM may be applied for the UE machine device 110. Energy efficient MM may include, for example, an extremely long time interval between measurements and reporting and a lowered number of transmissions. However, if the information relating to energy accessibility indicates access to an unlimited amount of energy, the serving eNB 120 may choose whether or not to apply energy efficient MM and RRM. The serving eNB 120 would likewise accomplish this by transmitting a resource management procedure adjustment to the UE machine device 110.

In yet another exemplary embodiment, the machine device capability information includes information relating to a specific transmission pattern. Specific transmission patterns may include periodicity, size of typical data size in bytes, desired sleep cycle, limitations on channel coding capabilities, and any other appropriate information relating to a transmission pattern. The specific transmission pattern may be taken into consideration for MM and RRM. For example, for transmissions that occur on a known schedule, MM and RRM may be customized to minimize or eliminate transmissions, measurements, and any other power usage between transmissions. Adjustments to MM and RRM in this scenario would also be sent as part of a resource management procedure adjustment.

In an exemplary embodiment, the RRC connection setup message may be in accordance with 3GPP TS 36.331, with information elements added to indicate the resource management procedure adjustment, which as discussed above, may include one or more of a mobility management procedure adjustment and a radio resource management procedure adjustment. For example, in the case of customized RRM for a stationary UE machine device described above, a Boolean value, one bit information, could be included to indicate the removal of Radio Link Failure (RLF) triggering to save power. Similar information elements may be added for any mobility management and radio resource management procedure. These information elements are provided by way of example only, and any number or form of information elements may be added to indicate the desired resource management procedure adjustment.

Figure 9:
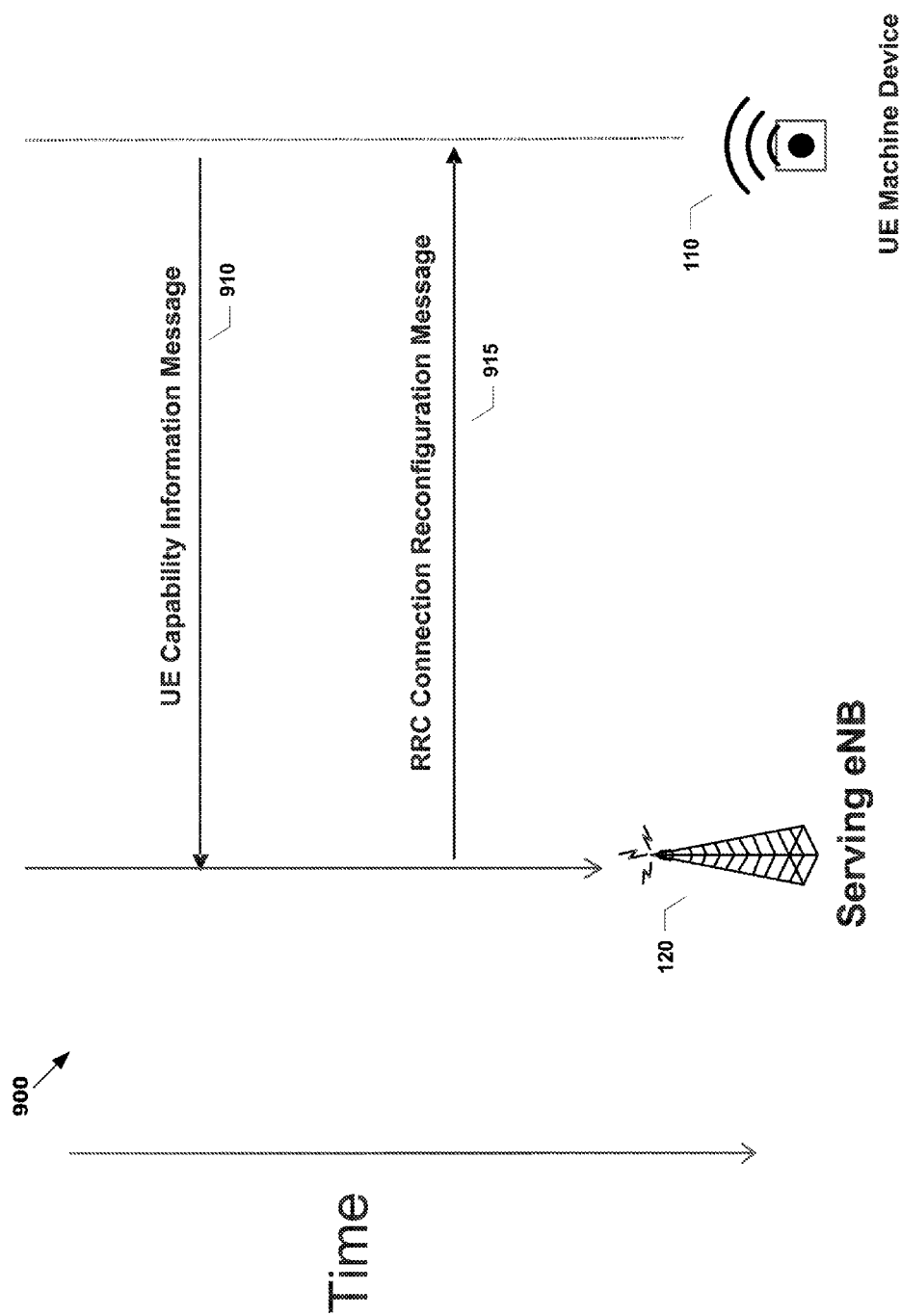
FIG. 9 is a time sequence diagram illustrating a second exemplary messaging flow for a method for adjusting radio resource management procedures in a machine device communicating with a node in a communication network, in accordance with exemplary embodiments of the present invention.

Referring now to FIG. 9, a time sequence diagram 900 illustrating a second exemplary messaging flow for a method for adjusting resource management procedures based on machine device capability information, in accordance with exemplary embodiments of the present invention, is shown. In one embodiment, UE machine device 110 sends a UE capability information message to serving eNB 120. The UE capability information message contains capability information which may include one or more of a mobility pattern, energy accessibility status, and transmission pattern. In response to the UE capability information message, the serving eNB 120 may send a RRC connection reconfiguration message 415 to the UE machine device 110. The RRC connection reconfiguration message, in this exemplary embodiment, may include a resource management procedure adjustment which in turn may include one or more of a mobility management procedure adjustment and a radio resource management procedure adjustment.

FIG. 10 is a diagram of information elements 1000 of a UE capability information message for use in a method for adjusting resource management procedures based on machine device capability information, in accordance with exemplary embodiments of the present invention. The diagram 1000 illustrates the information elements that may be included in the UE capability information message 910 sent from the UE machine device 110 to the serving eNB 120, as shown in the time sequence diagram 900 illustrated in FIG. 9.

Figure 11:
FIG. 11 is a diagram of information elements of a radio resource control (RRC) reconfiguration message for use in a method for adjusting radio resource management procedures in a machine device communicating with a node in a communication network, in accordance with exemplary embodiments of the present invention.

FIG. 11 is a diagram of information elements 1100 of a RRC connection reconfiguration message for use in a method for adjusting resource management procedures based on machine device capability information, in accordance with exemplary embodiments of the present invention. The diagram 1100 illustrates the information elements that may be included in the RRC connection reconfiguration message 915 sent from the serving eNB 120 to the UE machine device 110, as shown in the time sequence diagram 900 illustrated in FIG. 9.

In an exemplary embodiment, the UE capability information message 910 may be in accordance with 3GPP TS 36.331, with information elements added to indicate the UE machine device capability information, which as discussed above, may include one or more of a mobility pattern, energy accessibility status, and transmission pattern. For example, a new information element with a Boolean value, one bit information, indicating if the UE machine device 110 is stationary, may be added as a basic UE mobility pattern. Similar information elements may be added for power supply access and traffic pattern. These information elements are provided by way of example only, and any number or form of information elements may be added to indicate the UE machine device capability information.

In another exemplary embodiment, the RRC connection reconfiguration message may be also in accordance with 3GPP TS 36.331, with information elements added to indicate the resource management procedure adjustment, which as discussed above, may include one or more of a mobility management procedure adjustment and a radio resource management procedure adjustment. For example, in the case of customized RRM for a stationary UE machine device described above, a Boolean value, one bit information, could be included to indicate the removal of Radio Link Failure (RLF) triggering to save power. Similar information elements may be added for any of the mobility management and radio resource management procedures. These information elements are provided by way of example only, and any number or form of information elements may be added to indicate the desired resource management procedure adjustment.

Figure 12:
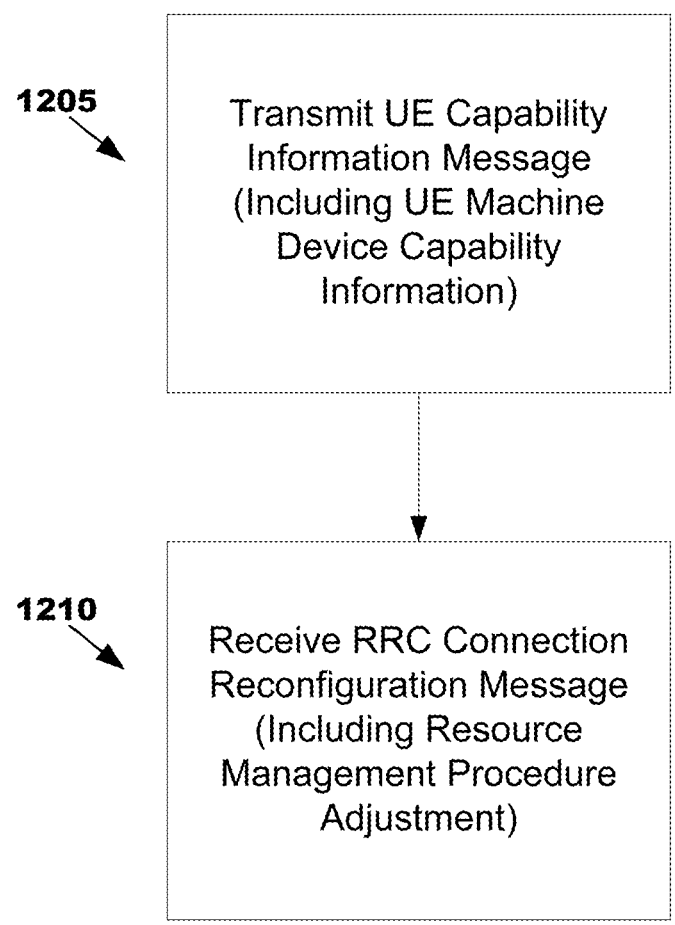
FIG. 12 is a flow chart illustrating the steps performed by a machine device in a method for adjusting radio resource management procedures in a machine device communicating with a node in a communication network using a UE capability information message and a RRC connection reconfiguration message, in accordance with exemplary embodiments of the present invention.
Figure 13:
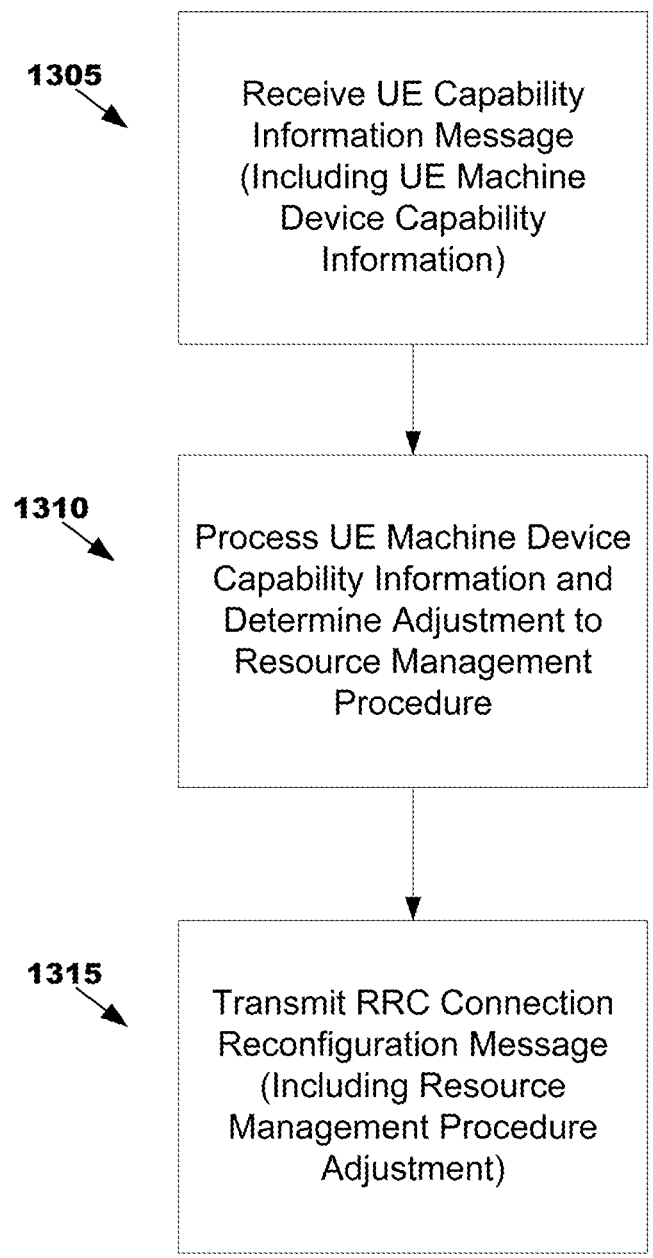
FIG. 13 is a flow chart illustrating the steps performed by a node in a method for adjusting radio resource management procedures in a machine device communicating with a node in a communication network using a UE capability information message and a RRC connection reconfiguration message, in accordance with exemplary embodiments of the present invention.

Referring now to FIGS. 12 and 13, flow charts illustrating a method for adjusting resource management procedures based on machine device capability information using a UE capability information message and a RRC connection reconfiguration message, in accordance with exemplary embodiments of the present invention, are provided. In the flow chart of FIG. 12, the steps are being performed by the UE machine device 110. In the flow chart of FIG. 13, the steps are being performed by the serving eNB 120.

Referring first to FIG. 12, in step 1205, the UE machine device 110 transmits a UE capability information message to the serving eNB 120 which includes UE machine device capability information. Then, in step 1210, the UE machine device 110 receives from the serving eNB 120 a RRC connection reconfiguration message which may include resource management procedure adjustments determined by the serving eNB 120. As described above, the resource management procedure adjustments may include one or more of a mobility management procedure and a radio resource management procedure.

Referring now to FIG. 13, in step 1305, the serving eNB 120 receives the UE capability information message from the UE machine device 110 which includes the UE machine device capability information. Then, in step 1310, the serving eNB 120 processes the received machine device capability information and determines an adjustment to a resource management procedure to be used by the UE machine device 110. Finally, in step 1315, the serving eNB 120 transmits the resource management procedure adjustment to the UE machine device 110 as part of a RRC connection reconfiguration message.

Figure 14:
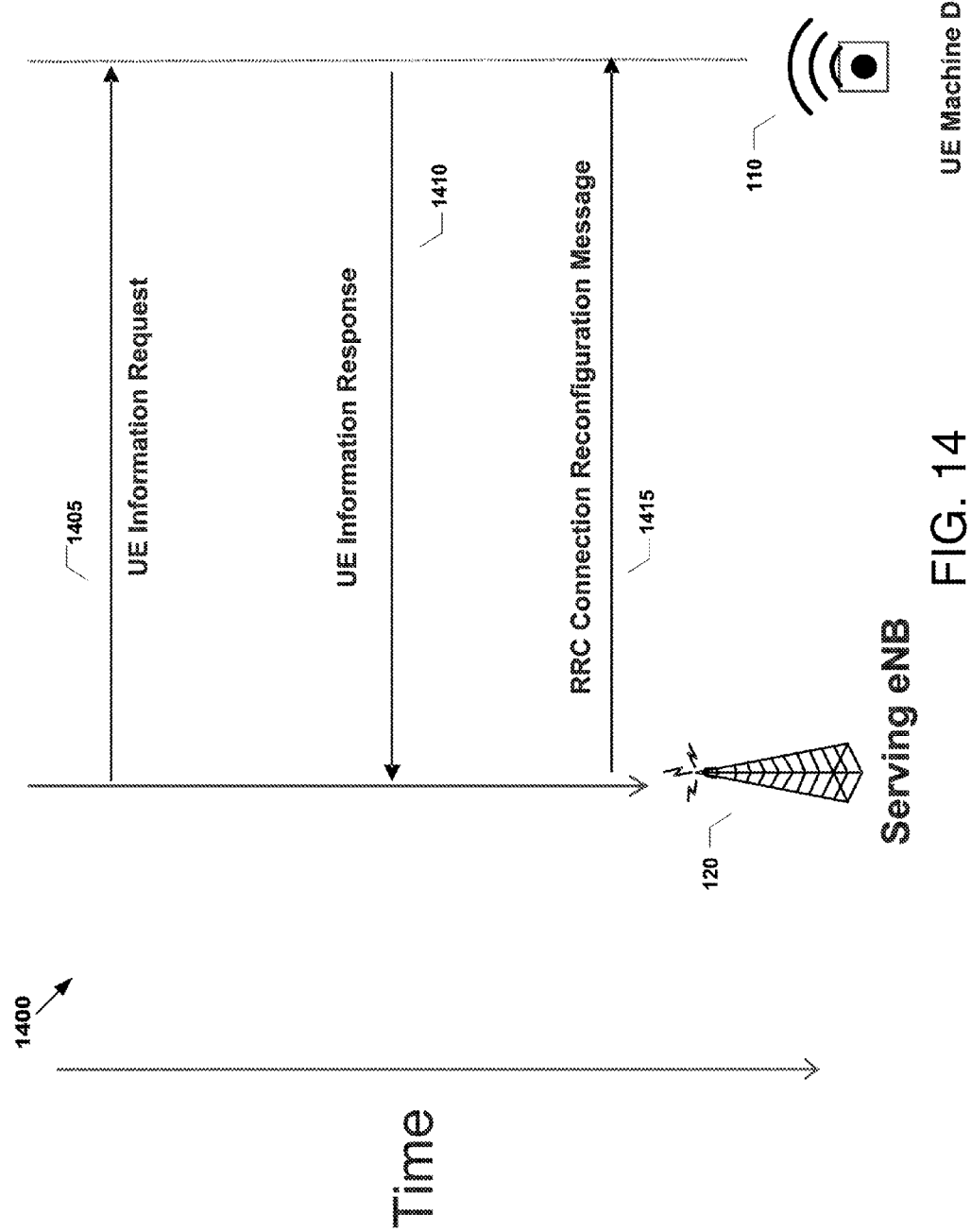
FIG. 14 is a time sequence diagram illustrating a third exemplary messaging flow for a method for adjusting radio resource management procedures in a machine device communicating with a node in a communication network, in accordance with exemplary embodiments of the present invention.

Referring now to FIG. 14, a time sequence diagram 1400 illustrating a third exemplary messaging flow for a method for adjusting resource management procedures based on machine device capability information, in accordance with exemplary embodiments of the present invention, is shown. In one embodiment, serving eNB 120 sends a UE information request 1405 to the UE machine device 110. The UE machine device 110 then sends a UE information response 1410 to the serving eNB 120 which includes UE machine device capability information including one or more of a mobility pattern, energy accessibility status, and transmission pattern. In response to the UE information response, the serving eNB 120 may send a RRC connection reconfiguration message 1415 to the UE machine device 110. The RRC connection reconfiguration message, in this exemplary embodiment, may include a resource management procedure adjustment which in turn may include one or more of a mobility management procedure adjustment and a radio resource management procedure adjustment.

Figure 15:
FIG. 15 is a diagram of information elements of a UE information request for use in a method for adjusting radio resource management procedures in a machine device communicating with a node in a communication network, in accordance with exemplary embodiments of the present invention.

FIG. 15 is a diagram of information elements 1500 of a UE information request for use in a method for adjusting resource management procedures based on machine device capability information, in accordance with exemplary embodiments of the present invention. The diagram 1500 illustrates the information elements that may be included in the UE capability information request 1405 sent from the serving eNB 120 to the UE machine device 110, as shown in the time sequence diagram 1400 illustrated in FIG. 14.

FIG. 16 is a diagram of information elements 1600 of a UE information response for use in a method for adjusting resource management procedures based on machine device capability information, in accordance with exemplary embodiments of the present invention. The diagram 1600 illustrates the information elements that may be included in the UE capability information response 1410 sent from the UE machine device 110 to the serving eNB 120, as shown in the time sequence diagram 1400 illustrated in FIG. 14.

In an exemplary embodiment, the UE information request 1405 may be in accordance with 3GPP TS 36.331, with information elements added to indicate that UE capability information is requested. For example, a new information element with a Boolean value, one bit information, indicating a request for UE capability information may be added as a basic request for information. In other embodiments, any number of information elements may be added to indicate a request for UE capability information or a request for specific UE capability information.

In another exemplary embodiment, the UE information response 1410 may be in accordance with 3GPP TS 36.331, with information elements added to indicate the UE machine device capability information, which as discussed above, may include one or more of a mobility pattern, energy accessibility status, and transmission pattern. For example, a new information element with a Boolean value, one bit information, indicating if the UE machine device 110 is stationary, may be added as a basic UE mobility pattern. Similar information elements may be added for power supply access and traffic pattern. These information elements are provided by way of example only, and any number or form of information elements may be added to indicate the UE machine device capability information.

The information elements that may be included in the UE connection reconfiguration message are shown in FIG. 11 and described above. As discussed above, the UE connection reconfiguration message, in some embodiments, may also be in accordance with 3GPP TS 36.331, with information elements added to indicate the desired resource management procedure adjustment, which may include one or more of a mobility management procedure adjustment and a radio resource management procedure adjustment.

Figure 17:
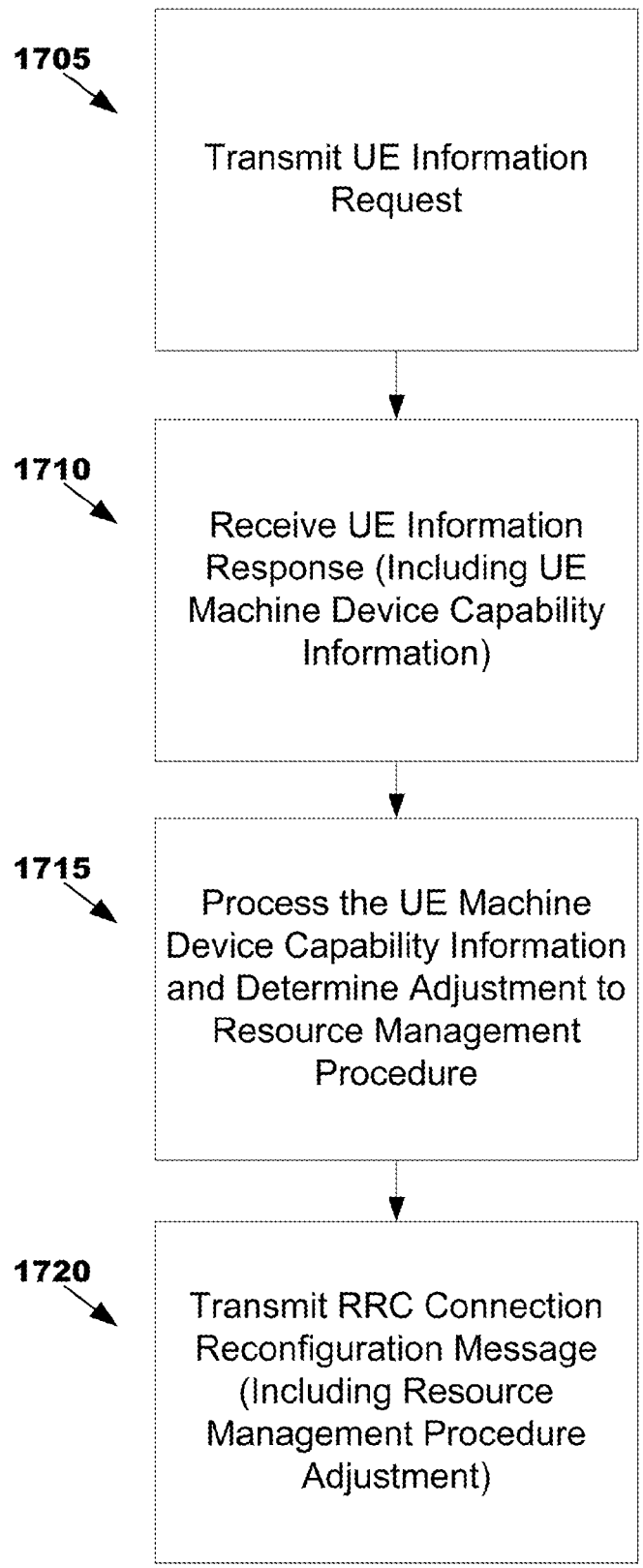
FIG. 17 is a flow chart illustrating the steps performed by a node in a method for adjusting radio resource management procedures in a machine device communicating with a node in a communication network using a UE information request and response and a RRC connection reconfiguration message, in accordance with exemplary embodiments of the present invention.
Figure 18:
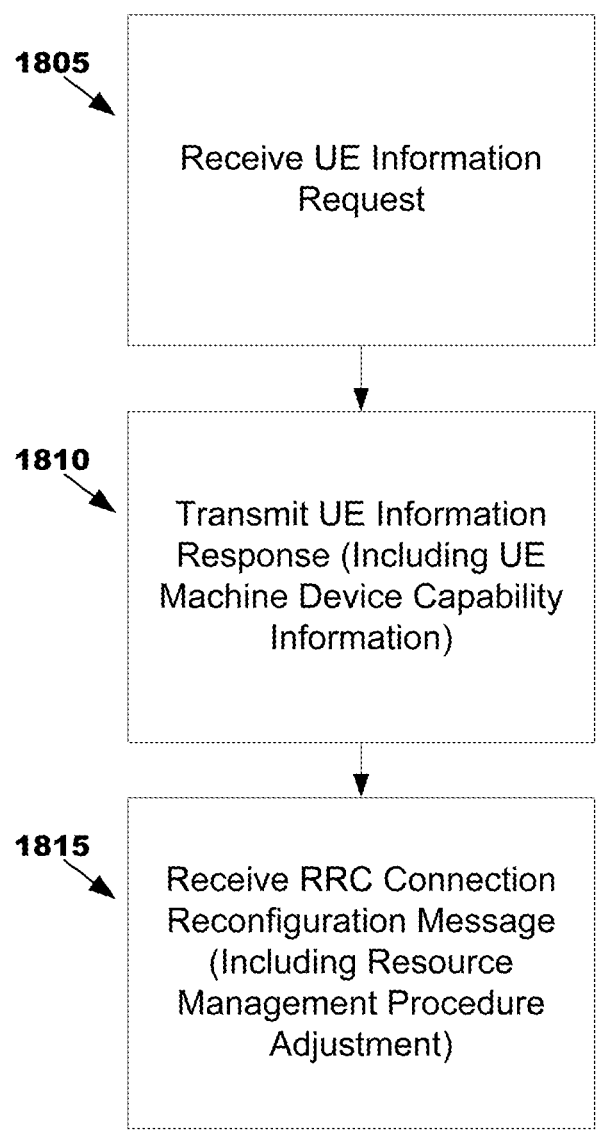
FIG. 18 is a flow chart illustrating the steps performed by a machine device in a method for adjusting radio resource management procedures in a machine device communicating with a node in a communication network using a UE information request and response and a RRC connection reconfiguration message, in accordance with exemplary embodiments of the present invention.

Referring now to FIGS. 17 and 18, flow charts illustrating a method for adjusting resource management procedures based on machine device capability information using UE information request and response messages and a RRC connection reconfiguration message, in accordance with exemplary embodiments of the present invention, are provided. In the flow chart of FIG. 17, the steps are being performed by the serving eNB 120. In the flow chart of FIG. 18, the steps are being performed by the UE machine device 110.

Referring first to FIG. 17, in step 1705, the serving eNB 120 transmits a UE information request to UE machine device 110 and receives, in step 1710, a UE information response from the UE machine device 110, which includes UE machine device capability information. Then, in step 1715, the serving eNB 120 processes the received machine device capability information and determines an adjustment to a resource management procedure to be used by the UE machine device 110. Finally, in step 1720, the serving eNB 120 transmits the resource management procedure adjustment to the UE machine device 110 as part of a RRC connection reconfiguration message.

Referring now to FIG. 18, in step 1805, the UE machine device 110 receives a UE information request transmitted from the serving eNB 120 and transmits, in step 1810, a UE information response to the serving eNB 120, which includes the UE machine device capability information. As described above, the machine device capability information may include, for example, information relating to one or more of a mobility pattern, energy accessibility, and transmission pattern. Then, in step 1815, the UE machine device 110 receives from the serving eNB 120 a RRC connection reconfiguration message which may include resource management procedure adjustments determined by the serving eNB 120. The resource management procedure adjustments may include one or more of a mobility management procedure and a radio resource management procedure.

Figure 19:
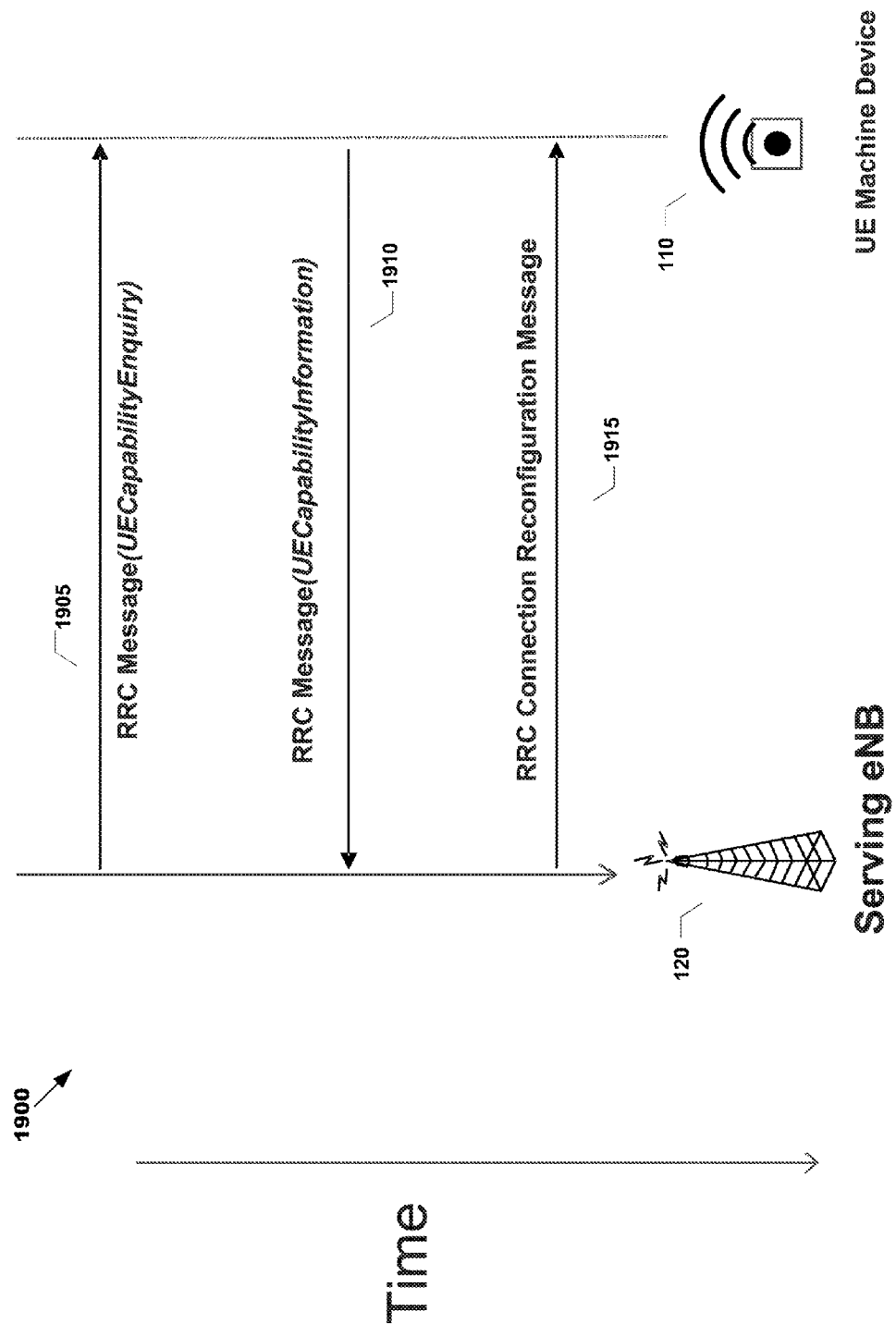
FIG. 19 is a time sequence diagram illustrating a fourth exemplary messaging flow for a method for adjusting radio resource management procedures in a machine device communicating with a node in a communication network, in accordance with exemplary embodiments of the present invention.

Referring now to FIG. 19, a time sequence diagram 1900 illustrating a fourth exemplary messaging flow for a method for adjusting resource management procedures based on machine device capability information, in accordance with exemplary embodiments of the present invention, is shown. In one embodiment, serving eNB 120 sends a radio resource control (RRC) message 1905 to the UE machine device 110. The RRC message can be in the form of a UECapabilityEnquiry. The UE machine device 110 then sends a RRC message 1910 back to the serving eNB 120. The return RRC message can be in the form of a UECapabilityInformation message which may include UE machine device capability information including one or more of a mobility pattern, energy accessibility status, and transmission pattern. In response to the UECapabilityInformation, the serving eNB 120 may send a RRC connection reconfiguration message 1715 to the UE machine device 110. The RRC connection reconfiguration message, in this exemplary embodiment, may include a resource management procedure adjustment which in turn may include one or more of a mobility management procedure adjustment and a radio resource management procedure adjustment.

FIG. 20 is a diagram of information elements 2000 of a RRC message in the form of a UECapabilityEnquiry for use in a method for adjusting resource management procedures based on machine device capability information, in accordance with exemplary embodiments of the present invention. The diagram 2000 illustrates the information elements that may be included in the RRC message 1905 sent from the serving eNB 120 to the UE machine device 110, as shown in the time sequence diagram 1900 illustrated in FIG. 19.

FIG. 21 is a diagram of information elements 2100 of a RRC message in the form of a UECapabilityInformation response for use in a method for adjusting resource management procedures based on machine device capability information, in accordance with exemplary embodiments of the present invention. The diagram 2100 illustrates the information elements that may be included in the UE capability information response 1910 sent from the UE machine device 110 to the serving eNB 120, as shown in the time sequence diagram 1900 illustrated in FIG. 19.

In an exemplary embodiment, the RRC message in the form of a UECapabilityEnquiry 1905 may be in accordance with 3GPP TS 36.331, with information elements added to indicate that UE capability information is requested. For example, a new information element with a Boolean value, one bit information, indicating a request for UE capability information may be added as a basic request for information. In other embodiments, any number of information elements may be added to indicate a request for UE capability information or a request for specific UE capability information.

In another exemplary embodiment, the RRC message in the form of a UECapabilityInformation 1910 may be in accordance with 3GPP TS 36.331, with information elements added to indicate the UE machine device capability information, which as discussed above, may include one or more of a mobility pattern, energy accessibility status, and transmission pattern. For example, a new information element with a Boolean value, one bit information, indicating if the UE machine device 110 is stationary, may be added as a basic UE mobility pattern. Similar information elements may be added for power supply access and traffic pattern. These information elements are provided by way of example only, and any number or form of information elements may be added to indicate the UE machine device capability information.

The information elements that may be included in the UE connection reconfiguration message are shown in FIG. 11 and described above. As discussed above, the UE connection reconfiguration message, in some embodiments, may also be in accordance with 3GPP TS 36.331, with information elements added to indicate the desired resource management procedure adjustment, which may include one or more of a mobility management procedure adjustment and a radio resource management procedure adjustment.

Figure 22:
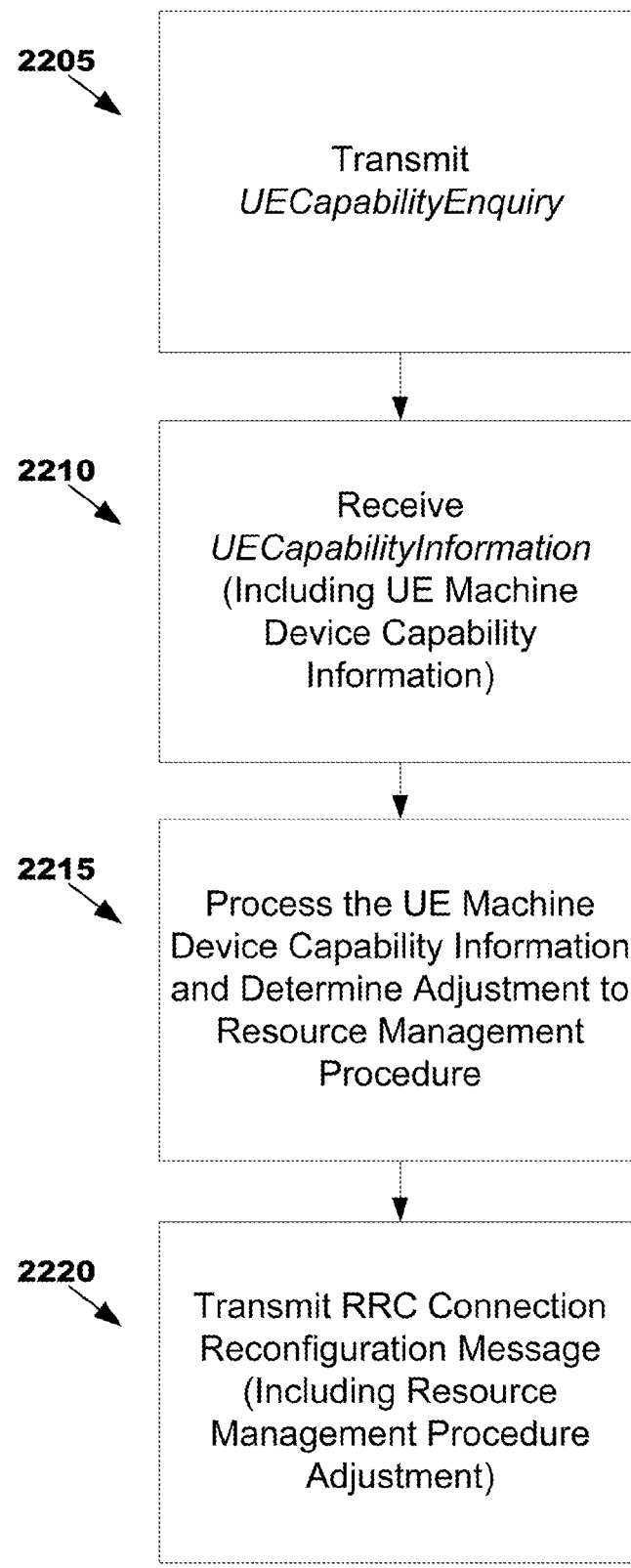
FIG. 22 is a flow chart illustrating the steps performed by a node in a method for adjusting radio resource management procedures in a machine device communicating with a node in a communication network using radio resource control (RRC) message in the form of UECapabilityEnquiry and UECapabilityInformation messages and a RRC connection reconfiguration message, in accordance with exemplary embodiments of the present invention.
Figure 23:
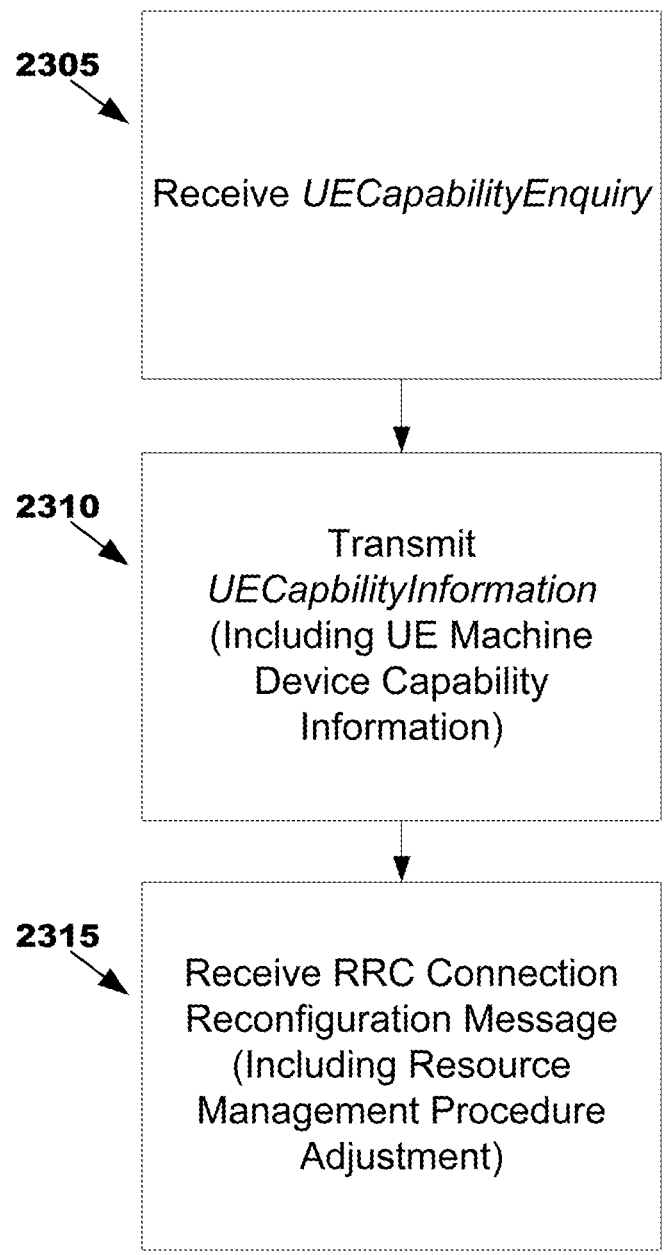
FIG. 23 is a flow chart illustrating the steps performed by a machine device in a method for adjusting radio resource management procedures in a machine device communicating with a node in a communication network using radio resource control (RRC) message in the form of UECapabilityEnquiry and UECapabilityInformation messages and a RRC connection reconfiguration message, in accordance with exemplary embodiments of the present invention.

Referring now to FIGS. 22 and 23, flow charts illustrating a method for adjusting resource management procedures based on machine device capability information using RRC messages, in accordance with exemplary embodiments of the present invention, are provided. In the flow chart of FIG. 22, the steps are being performed by the serving eNB 120. In the flow chart of FIG. 23, the steps are being performed by the UE machine device 110.

Referring first to FIG. 22, in step 2205, the serving eNB 120 transmits a RRC message in the form of a UECapabilityEnquiry to UE machine device 110 and receives, in step 2210, a RRC message in the form of a UECapabilityInformation response from the UE machine device 110 which includes the UE machine device capability information. Then, in step 2215, the serving eNB 120 processes the received machine device capability information and determines an adjustment to a resource management procedure to be used by the UE machine device 110. Finally, in step 2220, the serving eNB 120 transmits the resource management procedure adjustment to the UE machine device 110 as part of a RRC connection reconfiguration message.

Referring now to FIG. 23, in step 2305, the UE machine device 110 receives the RRC message in the form of a UECapabilityEnquiry transmitted from the serving eNB 120 and transmits, in step 2310, a RRC message in the form of a UECapabilityInformation response to the serving eNB 120 which includes the UE machine device capability information. As described above, the machine device capability information may include, for example, information relating to one or more of a mobility pattern, energy accessibility, and transmission pattern. Then, in step 2315, the UE machine device 110 receives from the serving eNB 120 a RRC connection reconfiguration message which may include resource management procedure adjustments determined by the serving eNB 120. The resource management procedure adjustments may include one or more of a mobility management procedure and a radio resource management procedure.

While various embodiments have been described above, it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the methods described above and illustrated in the drawings are shown as a sequence of steps, this was done solely for the sake of illustration. Accordingly, it is contemplated that some steps may be added, some steps may be omitted, the order of steps may be re-arranged, and some steps may be performed in parallel.

What is claimed is:

1. A method for adjusting resource management procedures in a machine device communicating with a node in a communication network, the method comprising:
   receiving a first message from the machine device, the first message including machine device capability information;
   processing the received machine device capability information to determine an adjustment to a resource management procedure; and
   transmitting a second message to the machine device, the second message including the determined resource management procedure adjustment.

2. The method of claim 1, wherein the machine device capability information includes information relating to one or more of a mobility pattern, an energy accessibility, and a transmission pattern.

3. The method of claim 2, wherein the machine device capability information includes information relating to mobility pattern indicating the machine device is positioned at a fixed location.

4. The method of claim 3, wherein the determined resource management procedure adjustment includes adjusting a mobility management procedure to apply light mobility management, eliminating the need for paging the machine device for subsequent data transmissions.

5. The method of claim 2, wherein the machine device capability information includes information relating to energy accessibility indicating the machine device has access to a power supply.

6. The method of claim 2, wherein the machine device capability information includes information relating to transmission pattern indicating, for the machine device, one or more of periodicity of transmissions, average data transmission size, desired sleep cycle and modulation and coding scheme (MCS) capability.

7. The method of claim 1, wherein the determined resource management procedure adjustment includes adjusting one or more of a mobility management procedure and a radio resource management procedure.

8. The method of claim 7, wherein the adjusted mobility management procedure includes one or more of a time interval between measurements, time interval between reporting, report size, report quantity, number of transmissions, and one or more parameters relating to reporting triggering criteria.

9. The method of claim 7, wherein the adjusted radio resource management procedure includes one or more of scheduling, link adaptation, power control, load control and DRX cycle.

10. The method of claim 9, wherein the adjusted radio resource management procedure includes power control, and wherein the power control includes setting an initial transmission power level for random access attempts to a value equal to a last transmission power level during a previous random access attempt or a previous activity period if no power control setting is received.

11. The method of claim 1, further comprising, transmitting, prior to receiving the first message, a third message to the machine device, the third message including a request for machine device capability information.

12. The method of claim 1, wherein the adjusted radio resource management procedure includes power control, and wherein the power control includes setting an initial transmission power level for random access attempts to a value equal to a last transmission power level during a previous random access attempt or a previous activity period if no power control setting is received.

13. A node operable in a communication network to transmit messages to and receive messages from a machine device, comprising:
   a processor;
   a memory coupled to the processor;
   a network interface coupled to the processor;
   a transceiver coupled to the network interface; and
   an antenna coupled to the transceiver configured to transmit and receive messages;
   wherein the processor is configured to:
   receive a first message from the machine device, the first message including machine device capability information;
   process the received machine device capability information to determine an adjustment to a resource management procedure; and
   transmit a second message to the machine device, the second message including the determined resource management procedure adjustment.

14. The node of claim 13, wherein the machine device capability information includes information relating to one or more of a mobility pattern, an energy accessibility, and a transmission pattern.

15. The node of claim 14, wherein the machine device capability information includes information relating to mobility pattern indicating the machine device is positioned at a fixed location.

16. The node of claim 15, wherein the determined resource management procedure adjustment includes adjusting a mobility management procedure to apply light mobility management, eliminating the need for paging the machine device for subsequent data transmissions.

17. The node of claim 14, wherein the machine device capability information includes information relating to energy accessibility indicating the machine device has access to a power supply.

18. The node of claim 14, wherein the machine device capability information includes information relating to transmission pattern indicating, for the machine device, one or more of periodicity of transmissions, average data transmission size, desired sleep cycle and modulation and coding scheme (MCS) capability.

19. The node of claim 13, wherein the determined resource management procedure adjustment includes adjusting one or more of a mobility management procedure and a radio resource management procedure.

20. The node of claim 19, wherein the adjusted mobility management procedure includes one or more of a time interval between measurements, time interval between reporting, report size, report quantity, number of transmissions, and one or more parameters relating to reporting triggering criteria.

21. The node of claim 19, wherein the adjusted radio resource management procedure includes one or more of scheduling, link adaptation, power control, load control and DRX cycle.

22. The node of claim 21, wherein the adjusted radio resource management procedure includes power control, and wherein the power control includes setting an initial transmission power level for random access attempts to a value equal to a last transmission power level during a previous random access attempt or a previous activity period if no power control setting is received.

23. The node of claim 13, wherein the processor is further configured to transmit, prior to receiving the first message, a third message to the machine device, the third message including a request for machine device capability information.

24. The node of claim 13, wherein the adjusted radio resource management procedure includes power control, and wherein the power control includes setting an initial transmission power level for random access attempts to a value equal to a last transmission power level during a previous random access attempt or a previous activity period if no power control setting is received.

25. A method for adjusting resource management procedures in a machine device communicating with a node in a communication network, the method comprising:
   identifying machine device capability information for transmission to the node;
   transmitting a first message to the node, the first message including the machine device capability information;
   receiving a second message from the node, the second message including a determined adjustment to a resource management procedure; and
   adjusting the resource management procedure based on the received determined adjustment.

26. The method of claim 25, wherein the machine device capability information includes information relating to one or more of a mobility pattern, an energy accessibility, and a transmission pattern.

27. The method of claim 26, wherein the machine device capability information includes information relating to mobility pattern indicating the machine device is positioned at a fixed location.

28. The method of claim 27, wherein the determined resource management procedure adjustment includes adjusting a mobility management procedure to apply light mobility management, eliminating one or more of measuring reference symbols for handover and for cell reselection and transmitting sounding reference signals to the node.

29. The method of claim 26, wherein the machine device capability information includes information relating to energy accessibility indicating the machine device has access to a power supply.

30. The method of claim 26, wherein the machine device capability information includes information relating to transmission pattern indicating, for the machine device, one or more of periodicity of transmissions, average data transmission size, desired sleep cycle and modulation and coding scheme (MCS) capability.

31. The method of claim 25, wherein the determined resource management procedure adjustment includes adjusting one or more of a mobility management procedure and a radio resource management procedure.

32. The method of claim 31, wherein the adjusted mobility management procedure includes one or more of a time interval between measurements, time interval between reporting, report size, report quantity, number of transmissions and one or more parameters relating to reporting triggering criteria.

33. The method of claim 31, wherein the adjusted radio resource management procedure includes one or more of scheduling, link adaptation, power control, load control and DRX cycle.

34. The method of claim 33, wherein the adjusted radio resource management procedure includes power control, and wherein the power control includes setting an initial transmission power level for random access attempts to a value equal to a last transmission power level during a previous random access attempt or a previous activity period if no power control setting is received.

35. The method of claim 25, further comprising, receiving, prior to transmitting the first message, a third message from the node, the third message including a request for machine device capability information.

36. The method of claim 25, further comprising, measuring, prior to transmitting the first message to the node, a value relating to a radio channel quality for transmitting to the node, and transmitting the first message to the node only when the measured value is greater than a predetermined threshold value.

37. The method of claim 25, wherein the adjusted radio resource management procedure includes power control, and wherein the power control includes setting an initial transmission power level for random access attempts to a value equal to a last transmission power level during a previous random access attempt or a previous activity period if no power control setting is received.

38. A machine device operable in a communication network to transmit messages to and receive messages from a node, comprising:
 a processor;
 a memory coupled to the processor;
 a transceiver coupled to the processor; and
 an antenna coupled to the transceiver configured to transmit and receive messages;
 wherein the processor is configured to:
 identify machine device capability information for transmission to the node;
 transmit a first message to the node, the first message including the machine device capability information;
 receive a second message from the node, the second message including a determined adjustment to a resource management procedure; and
 adjust the resource management procedure based on the received determined adjustment.

39. The machine device of claim 38, wherein the machine device capability information includes information relating to one or more of a mobility pattern, an energy accessibility, and a transmission pattern.

40. The machine device of claim 39, wherein the machine device capability information includes information relating to mobility pattern indicating the machine device is positioned at a fixed location.

41. The machine device of claim 40, wherein the determined resource management procedure adjustment includes adjusting a mobility management procedure to apply light mobility management, eliminating one or more of measuring reference symbols for handover and for cell reselection and transmitting sounding reference signals to the node.

42. The machine device of claim 39, wherein the machine device capability information includes information relating to energy accessibility indicating the machine device has access to a power supply.

43. The machine device of claim 39, wherein the machine device capability information includes information relating to transmission pattern indicating, for the machine device, one or more of periodicity of transmissions, average data transmission size, desired sleep cycle and modulation and coding scheme (MCS) capability.

44. The machine device of claim 38, wherein the determined resource management procedure adjustment includes adjusting one or more of a mobility management procedure and a radio resource management procedure.

45. The machine device of claim 44, wherein the adjusted mobility management procedure includes one or more of a time interval between measurements, time interval between reporting, report size, report quantity, number of transmissions and one or more parameters relating to reporting triggering criteria.

46. The machine device of claim 44, wherein the adjusted radio resource management procedure includes one or more of scheduling, link adaptation, power control, load control and DRX cycle.

47. The machine device of claim 46, wherein the adjusted radio resource management procedure includes power control, and wherein the power control includes setting an initial transmission power level for random access attempts to a value equal to a last transmission power level during a previous random access attempt or a previous activity period if no power control setting is received.

48. The machine device of claim 38, wherein the processor is further configured to receive, prior to transmitting the first message, a third message from the node, the third message including a request for machine device capability information.

49. The machine device of claim 38, wherein the processor is further configured to measure, prior to transmitting the first message to the node, a value relating to a radio channel quality for transmitting to the node, and to transmit the first message to the node only when the measured value is greater than a predetermined threshold value.

50. The machine device of claim 38, wherein the adjusted radio resource management procedure includes power control, and wherein the power control includes setting an initial transmission power level for random access attempts to a value equal to a last transmission power level during a previous random access attempt or a previous activity period if no power control setting is received.

* * * * *